United States Patent
Ziegler et al.

(10) Patent No.: US 11,187,531 B2
(45) Date of Patent: Nov. 30, 2021

(54) MULTICORE FIBER OPTIC GYRO

(71) Applicant: 4S-Silversword Software and Services, LLC, Catonsville, MD (US)

(72) Inventors: William R. A. Ziegler, Ijamsville, MD (US); Ronald H. Smith, Rockville, MD (US); Kevin Cooper, Frederick, MD (US)

(73) Assignee: 4S-Silversword Software and Services, LLC, Catonsville, MD (US)

( * ) Notice: Subject to any disclaimer, the term of this patent is extended or adjusted under 35 U.S.C. 154(b) by 0 days.

(21) Appl. No.: 17/157,834

(22) Filed: Jan. 25, 2021

(65) Prior Publication Data

US 2021/0231863 A1    Jul. 29, 2021

Related U.S. Application Data

(60) Provisional application No. 62/964,829, filed on Jan. 23, 2020.

(51) Int. Cl.
*G01C 19/64* (2006.01)
*G01C 19/72* (2006.01)
(Continued)

(52) U.S. Cl.
CPC ............ *G01C 19/722* (2013.01); *G01C 19/64* (2013.01); *G01C 19/721* (2013.01);
(Continued)

(58) Field of Classification Search
CPC .......................... G02B 6/4458; G02B 6/2934; G02B 6/29338; G02B 6/2551; G02B 6/02042;
(Continued)

(56) References Cited

U.S. PATENT DOCUMENTS 5,841,932 A * 11/1998 Page ................... G02B 6/4457
385/134
6,349,166 B1 * 2/2002 Kaliszek .............. G01C 19/722
385/134
(Continued)

FOREIGN PATENT DOCUMENTS

JP     2020016525 A  *  1/2020  ............. G01C 19/72

OTHER PUBLICATIONS

Advantages and Disadvantages of Using New Types of Photonic Fibers in Fiber-Optic Gyros, M Barulina et al 2020 IOP Conf. Ser.: Earth Environ. Sci. 459 062082 (Year: 2020).*
(Continued)

*Primary Examiner* — Ryan A Lepisto
(74) *Attorney, Agent, or Firm* — Gibraltar Consulting LLC; Tariq S. Najee-ullah

(57) ABSTRACT

Disclosed are systems and methods that utilize multicore optical fibers for gyro coil winding. Particularly, the use of multicore fiber enables inherent thermal stability without the need for complex, tedious, and costly winding patterns. Enabling the use of level winding techniques eliminates the need for complex quadrupole winding patterns. This simplicity lends itself to advancements towards full automation of winding coils for multicore fibers, without sacrificing performance. This, in turn increases the production rate and overcomes current barriers to fiber optic gyroscope (FOG) market expansion. In accordance with the embodiments, multicore fiber can be utilized in various gyro coil winding techniques, including: level winding; Interrupted Level Wind (ILW); and Dual Axis Symmetric (DAS) winding. Furthermore, each of the multicore fiber gyro coil winding patterns can incorporate a multicore shuffle bridge. The multicore shuffle bridge is designed to provide multiple features, such as facilitating the rotation of mating cores.

18 Claims, 8 Drawing Sheets

(51) Int. Cl.
  *G02B 6/02*    (2006.01)
  *G02B 6/255*   (2006.01)
  *G02B 6/293*   (2006.01)
  *G02B 6/44*    (2006.01)

(52) U.S. Cl.
  CPC ......... *G02B 6/2551* (2013.01); *G02B 6/4458* (2013.01); *G01C 19/726* (2013.01); *G02B 6/02042* (2013.01); *G02B 6/2934* (2013.01); *G02B 6/29338* (2013.01)

(58) Field of Classification Search
  CPC .. G01C 19/726; G01C 19/722; G01C 19/721; G01C 19/64
  See application file for complete search history.

(56) References Cited

U.S. PATENT DOCUMENTS

| | | | |
|---|---|---|---|
| 8,497,994 B2* | 7/2013 | Bergh | G01B 9/02049 356/460 |
| 9,103,676 B2* | 8/2015 | Bergh | G01C 19/64 |
| 9,696,513 B2* | 7/2017 | Bennett | C03C 25/1065 |

OTHER PUBLICATIONS

Performance Characteristics of a Multicore Interferometric Fiber Optic Gyroscope Using a 7-Core Fiber, IEEE Xplore, IEEE Conferences, Sep. 15, 2020, 2020 DGON Inertial Sensors and Systems (ISS) (pp. 1-20) (Year: 2020).*

* cited by examiner

MULTICORE FIBER OPTIC GYRO

RELATED APPLICATION(S)

Under provisions of 35 U.S.C. § 119(e), the Applicants claim the benefit of U.S. Provisional Patent Application No. 62/964,829, filed Jan. 23, 2020, which is incorporated herein by reference.

PCT application No. PCT/US21/14820 entitled "MULTICORE FIBER OPTIC GYRO," filed Jan. 23, 2021, are both hereby incorporated by reference.

It is intended that each of the referenced applications may be applicable to the concepts and embodiments disclosed herein, even if such concepts and embodiments are disclosed in the referenced applications with different limitations and configurations and described using different examples and terminology.

TECHNICAL FIELD

The present disclosure relates generally to Fiber Optic Gyroscopes (FOGs), and particularly to methods for winding patterns employed by FOGs in coiling optical fibers.

BACKGROUND

Many existing coil winding techniques are high skill, arduous, and slow due to numerous factors, including: winding pattern complexity; necessitating total precision; and the use of adhesive during winding. Several attempts have been made to automate winding quadrupole gyro coils, but these attempts have succeeded only for very low performance coils. Because quadrupole winding is such slow, painstaking work, the number of properly trained and high-performance coil capable technicians is limited. This personnel environment puts a severe constraint on the attainable production volume and associated negative feedback severely distorts the gyro cost structure.

BRIEF SUMMARY OF THE DISCLOSURE

According to the embodiments, systems and methods are described that can leverage multicore optical fibers in the gyro coil winding in a manner that reduces the complexity, cost, and size of the high precision fiber optic gyro coils. Particularly, the use of multicore fiber enables inherent thermal stability without the need for complex, tedious, and costly winding patterns. Enabling the use of level winding techniques eliminates the need for complex quadrupole winding patterns. This simplicity lends itself to advancements towards full automation of winding coils of multicore fiber, without sacrificing performance. This, in turn increases the production rate and overcomes current barriers to FOG market expansion. In accordance with the embodiments, multicore fiber can be utilized in various gyro coil winding techniques, including: level winding, Interrupted Level Wind (ILW), Quadrupole, and Dual Axis Symmetric (DAS) winding.

In a further aspect, an Inertial Navigation Units (INU) can include FOG technology. The INU can be a navigation device that uses a computer, motion sensors (accelerometers) and rotation sensors (gyroscopes) to continuously calculate by dead reckoning the position, the orientation, and the velocity (direction and speed of movement) of a moving object without the need for external references. In particular, the FOG can be integrated into gyroscope of the INU by precise winding of a fiber-optic coil. In this configuration, the INU can reduce the risk of laser lock as light propagates through the waveguides of the coils. Also using an FOG does not require any moving parts and increases the life span of the INU. Further, FOG technology has made steady progress during the last decades and has been proven from a performance perspective. Producibility has also improved with the information processing function well in hand, and Photonic Integrated Circuits (PIC) advancing to TRL 9 or higher. Despite these may advancements, a stubborn production bottleneck remains involving the winding the optical fiber Sagnac effect sensor coil.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations owned by the Applicants. The Applicants retain and reserve all rights in their representations included herein, and grant permission to reproduce the material only in connection with reproduction of the granted patent and for no other purpose.

The following description is provided as an enabling teaching of the disclosed articles, systems, and methods in their best, currently known embodiments. To this end, those skilled in the relevant art will recognize and appreciate that many changes can be made to the various aspects of the articles, systems, and methods described herein, while still obtaining the beneficial results of the disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "a gasket" can include two or more such gaskets unless the context indicates otherwise.

As used throughout, "substantially" with respect to a measure can refer to a range of values comprising +/−10 degrees or +/−10%. For example, substantially orthogonal, normal, or parallel can include embodiments, where the referenced components am oriented +/−10 degrees of being classified as orthogonal, normal, or parallel respectively. Further, substantially dimensioned components differ within 10% of each other. Substantially similar means there can be exceptions. Substantially similar means, in connection with a product, material, apparatus, or composition of matter, that such product, material, apparatus, or composition of matter, resembles, may be comparable to, similar in function to, in likeness to another product, material, apparatus, or composition of matter in all material functional aspects, allowing for differences only in aspects that do not influence the interchangeability of the first product, material, apparatus, or composition of matter and the second product, material, apparatus, or composition of matter.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

Furthermore, the drawings may contain text or captions that may explain certain embodiments of the present disclosure. This text is included for illustrative, non-limiting, explanatory purposes of certain embodiments detailed in the present disclosure. The accompanying drawings, which are incorporated in and constitute a part of this specification, illustrate several aspects of the disclosure and together with the description, serve to explain the principles of the disclosure.

Figure 1:
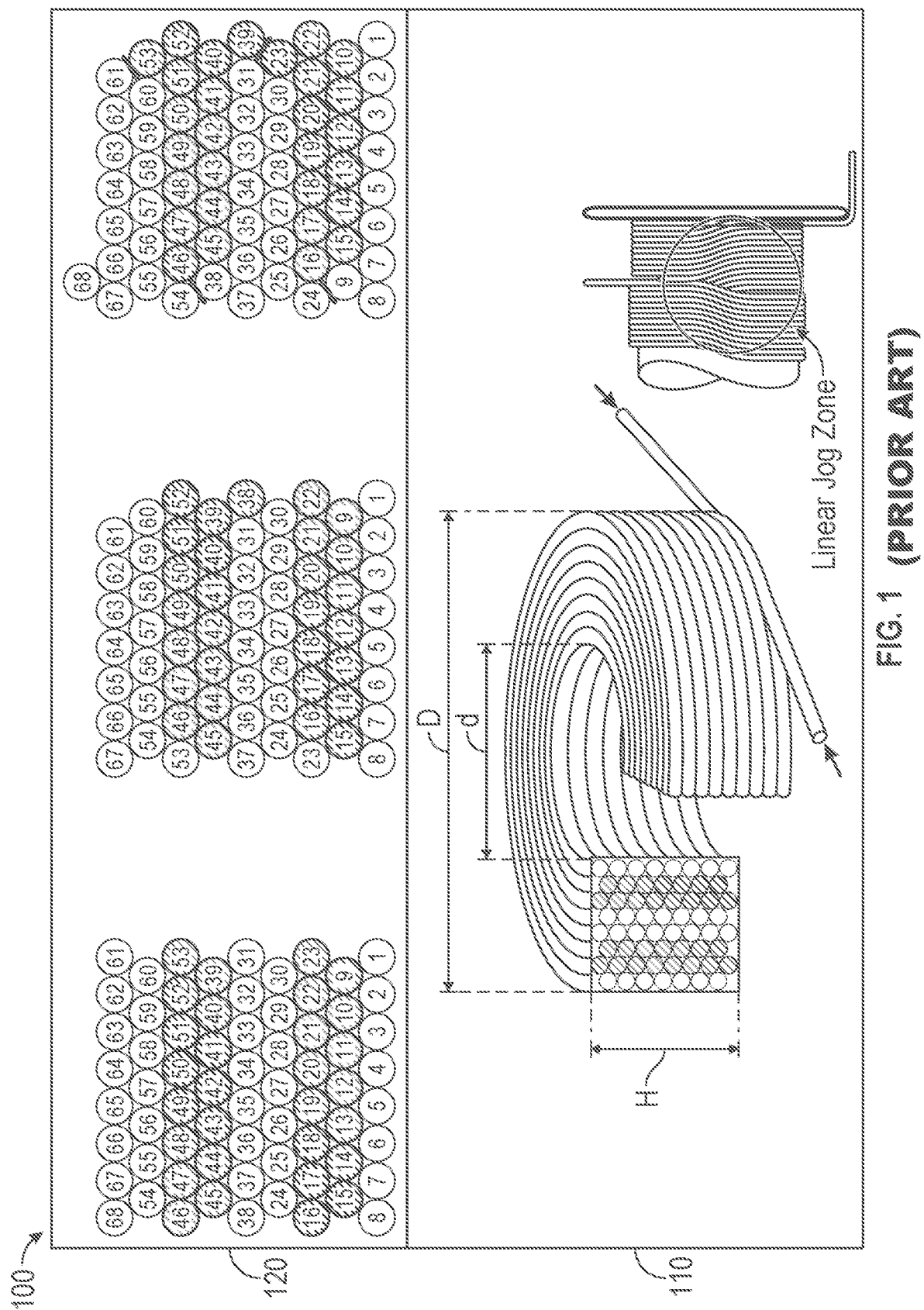

FIG. 1 depicts an example of a quadruple winding pattern, as used in prior art.

Figure 2:
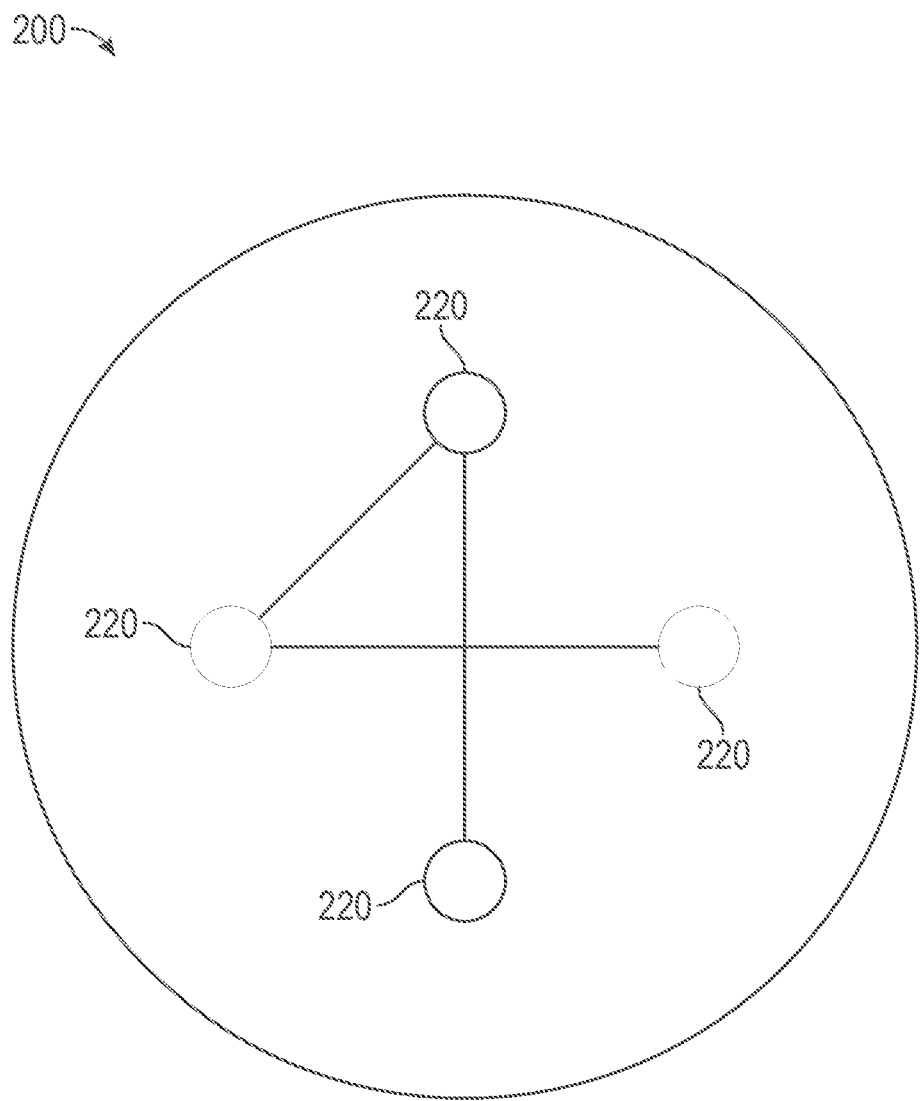

FIG. 2 depicts an end view for an exemplary four-core fiber, where the four-core fiber can be used in the multicore fiber optic gyro, in accordance with an exemplary embodiment of the present disclosure.

Figure 3:
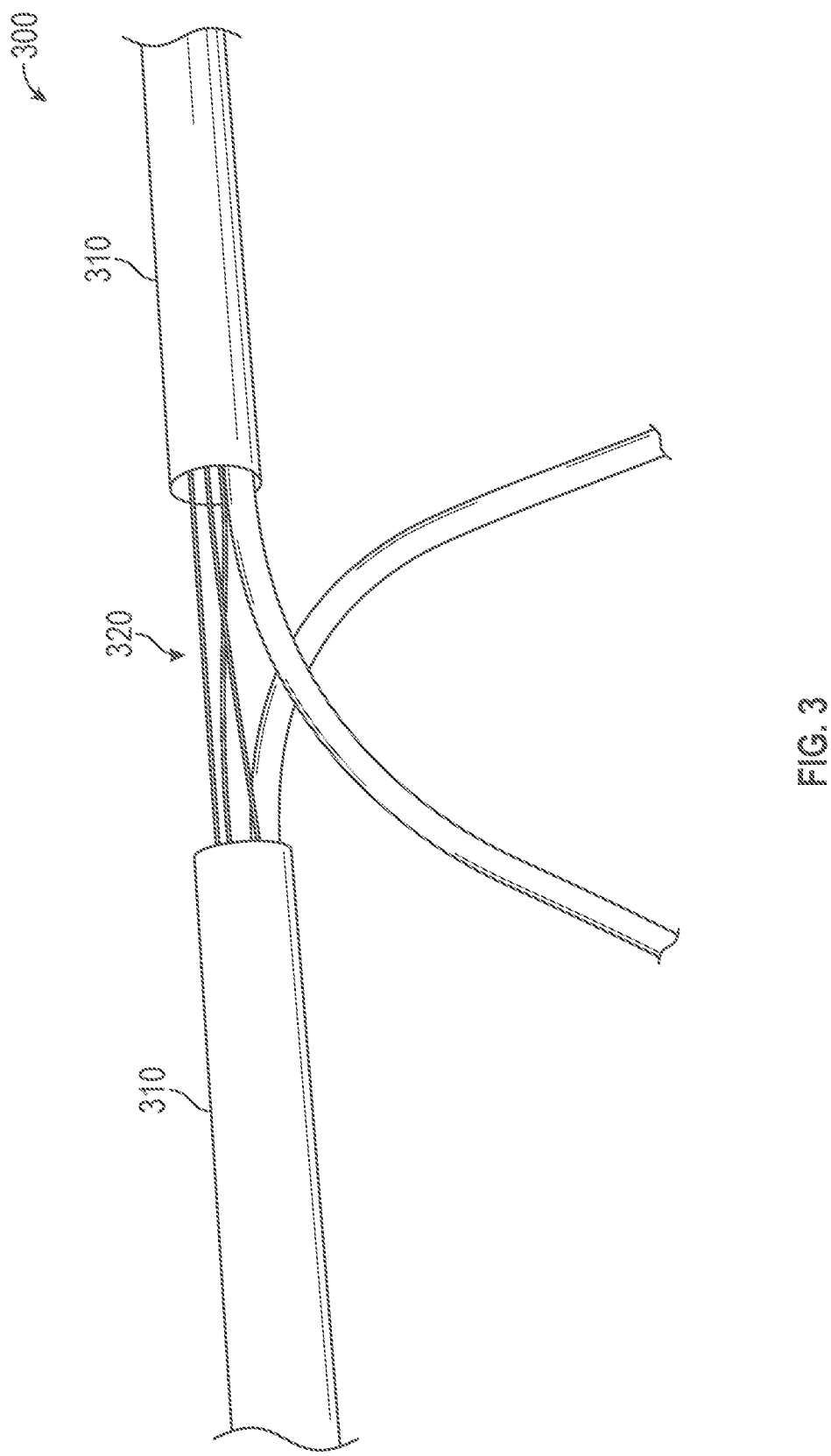

FIG. 3 depicts an example of a multicore shuffle bridge in accordance with an exemplary embodiment of the present disclosure.

Figure 4:
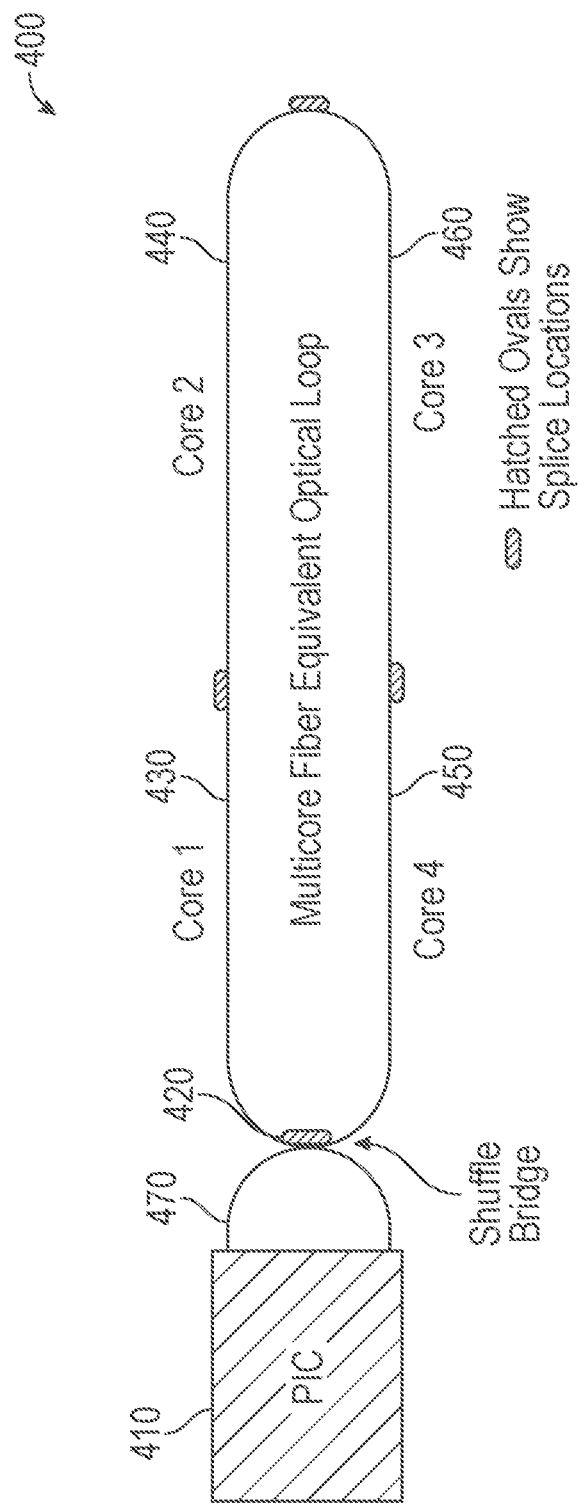

FIG. 4 depicts an example of a four-core fiber gyro coil in an unraveled configuration, in accordance with an exemplary embodiment of the present disclosure.

Figure 5:
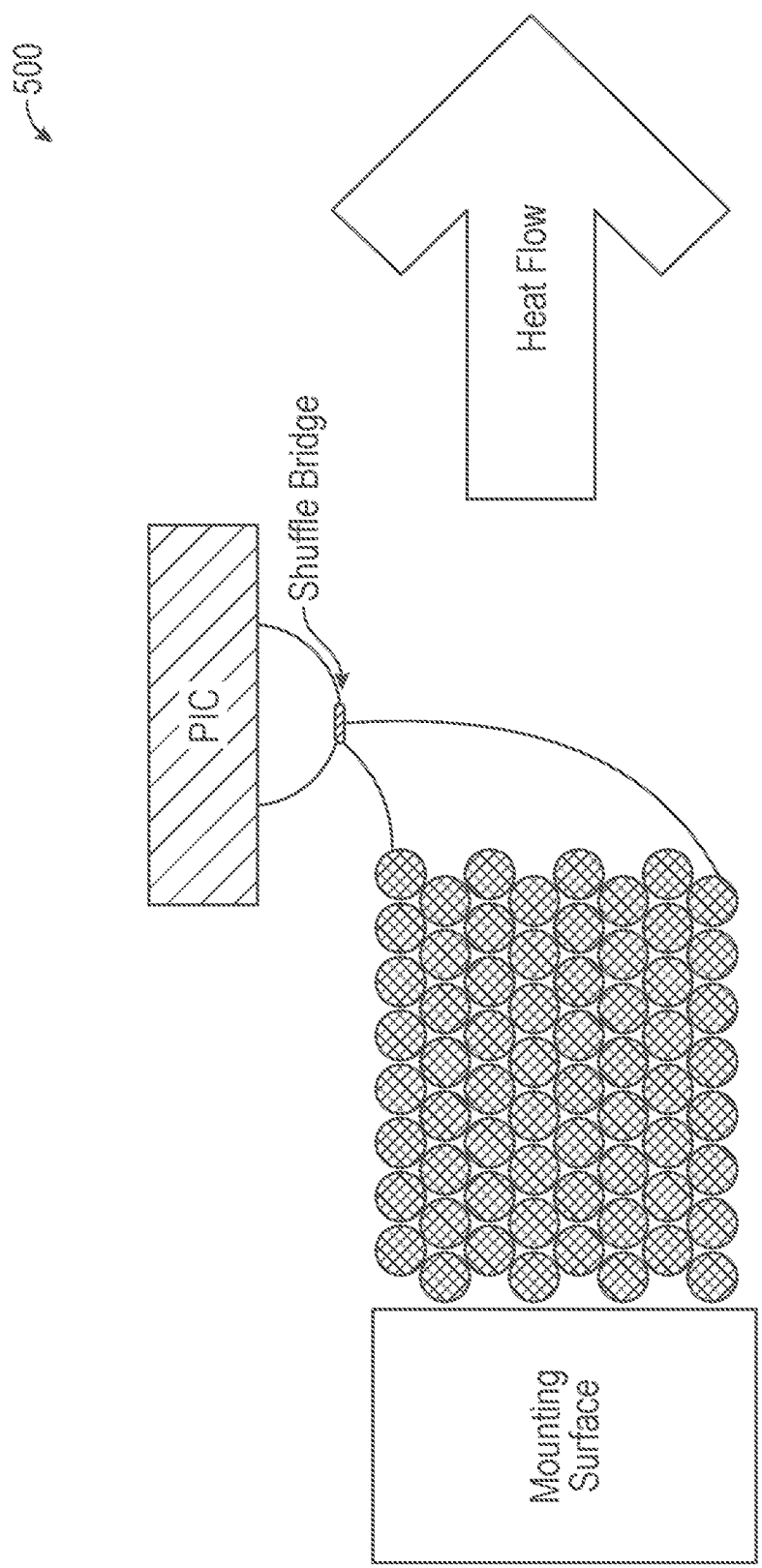

FIG. 5 depicts an example of a multicore fiber winding pattern, particularly a Level Winding pattern, in accordance with the exemplary embodiment of the present disclosure.

Figure 6:
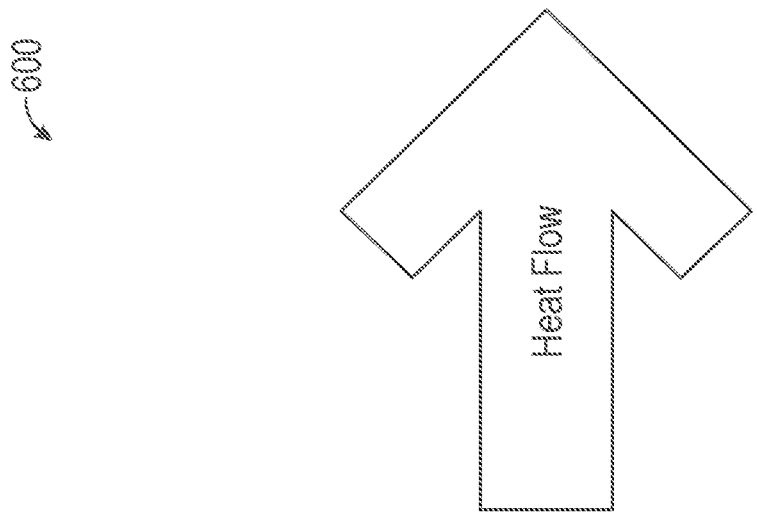
Figure 6:
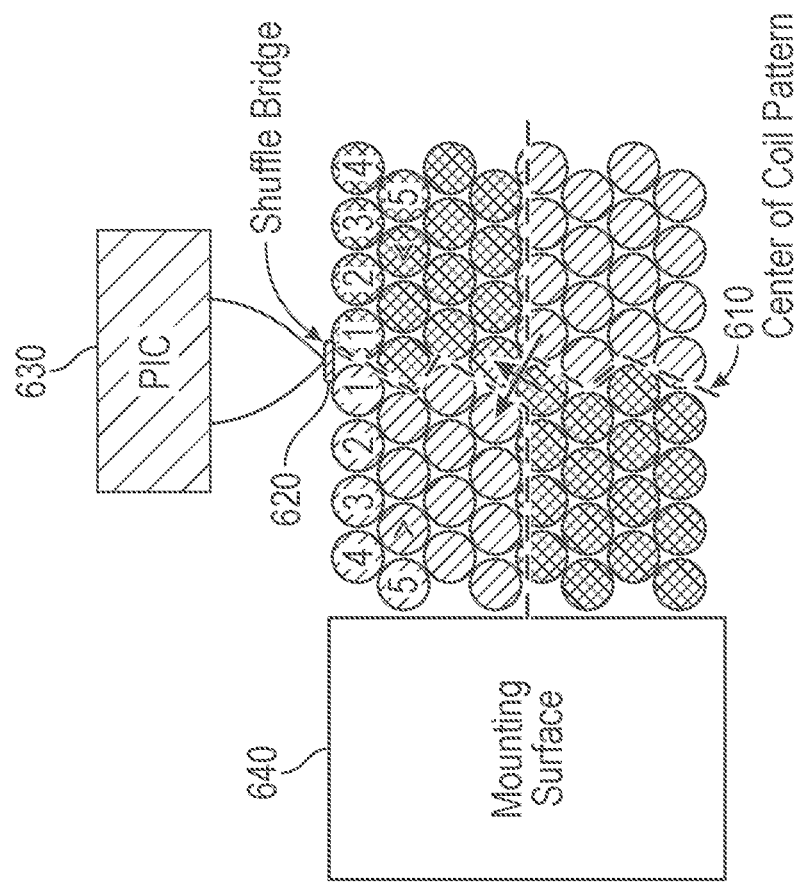

FIG. 6 depicts an example of another multicore fiber winding pattern, particularly an Interrupted Level Wind (ILW) pattern, in accordance with the exemplary embodiment of the present disclosure.

Figure 7:
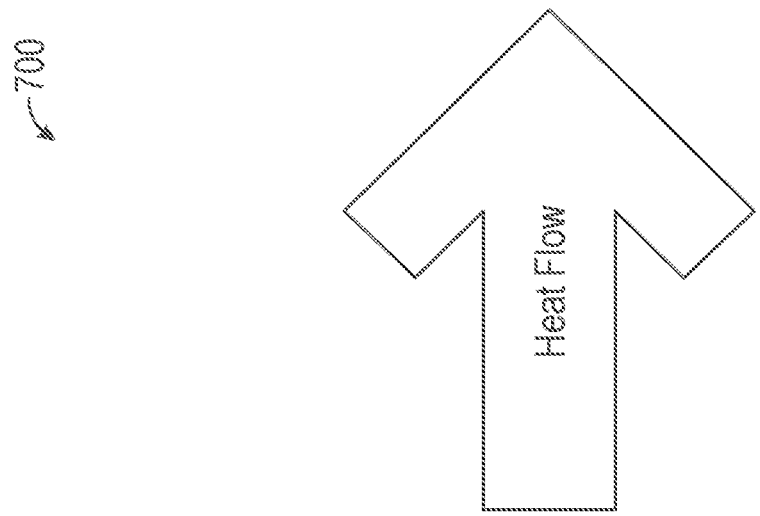
Figure 7:
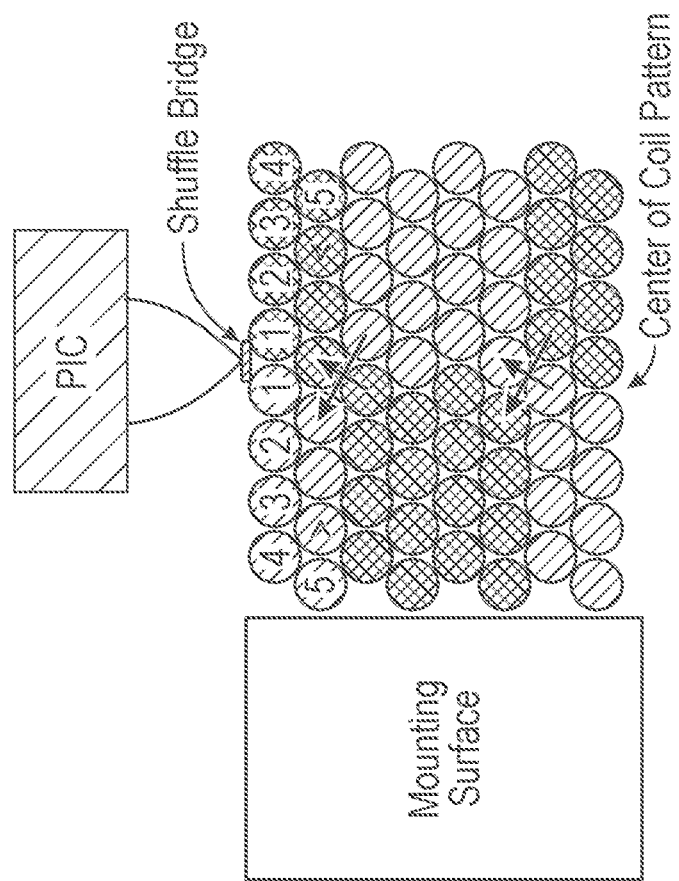

FIG. 7 depicts an example of yet another multicore fiber winding pattern, particularly a Dual Axis Symmetric (DAS) pattern, in accordance with the exemplary embodiment of the present disclosure.

Figure 8:
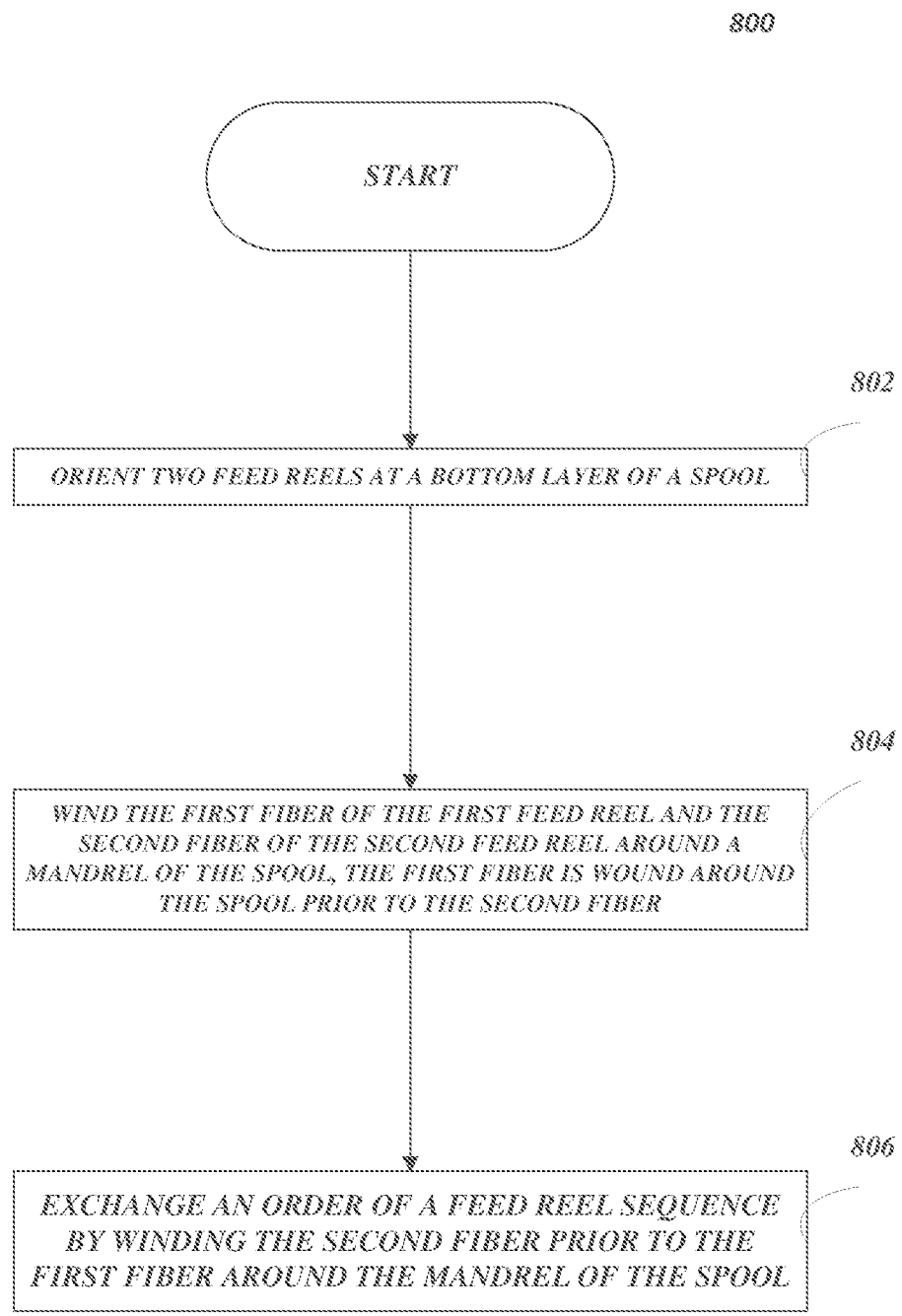

FIG. 8 is a flow chart setting forth the general stages involved in a method 800 consistent with an embodiment of the disclosure.

The figures are not exhaustive and do not limit the present disclosure to the precise form disclosed.

DETAILED DESCRIPTION

The present disclosure can be understood more readily by reference to the following detailed description of the disclosure and the examples included therein.

In FIG. 1, an example of a quadruple winding pattern 100 that is typically used with single core fiber is shown, as known in the art. In general, quadrupole gyro-coil winding can be considered an outdated technology. For example, Quadrupole gyro-coil winding technology currently utilizes equipment that was designed in the 1990's. The latest machines in Quadrupole gyro-coil winding were built in the early 2000's from incrementally improved designs. The highest precision coils are currently wound on these machines and require highly skilled technicians. As a general description, high precision coils can use a quadrupole winding pattern to create a thermal balance across the coil pack. Typically, quadrupole wound coils are wound wet; that is with epoxy deposited during the wind. Epoxy potting makes a robust coil package, but it can be difficult to wind as the epoxy acts as an index matching liquid on the coil rendering the fiber almost invisible to the winding technician. Also, coils can differ depending upon the gyro design and application. For instance, size can vary by width, diameter, length of fiber, and coil shape.

FOG winding patterns play an important role in the gyro performance. In most cases, precision quadrupole wound gyro-coils are wound from the center of a length of fiber in a pattern designed to reduce thermal transitions. Nonetheless, these patterns are complex and highly sensitive to fiber placement errors. Significant degradation in performance can occur when any error in winding is made. Furthermore, with fiber lengths ranging from a few hundred meters to several kilometers, it can take from a few hours to several days to wind each one.

In FIG. 1, as alluded to above, an example of the quadrupole winding pattern is illustrated. In each case, a pattern 120 is shown, where the winding is started with the fiber turn labeled 1 resting on one edge of the mandrel. In one aspect, a fiber can be wound around a spool comprising a mandrel and flanges. The flanges can function as stoppers, located at the top and bottom of the mandrel. Fiber turns can be drawn from alternate winding machine feed reels. Every turn can cross over an underlying turn once during each winding revolution, as shown by coil 110 in FIG. 1. The leftmost pattern is described as fully symmetric. It has better symmetry and better phase maintaining performance than the other variants, but the other variants are easier to wind because they provide bridging turns at the feed reel transitions. Alternatively, the winding patterns can leverage multicore fibers, as disclosed herein. These patterns can provide improved performance over many existing gyro coil windings, such as the quadruple single core winding pattern shown in FIG. 1. Thus, the disclosed techniques can potentially eliminate a production bottleneck, and reduce cost of optical fiber gyros. Moreover, the disclosed winding techniques can lead to the emergence of full automation, completing the cycle of fiber gyro production transformation.

FIG. 2 depicts an example of a multicore optical fiber 200 that can be coiled using the gyro coil winding techniques as disclosed herein. For example, the fiber 200 can be a polarization maintaining multicore fiber. The fiber 200 can realize several advantages for gyro coils, including: N cores in each fiber allowing for N times more waveguide length in a short coil (e.g., N=4 to 7). For example, inherent thermal balance in tightly coupled cores in a small coil may allow use of level winding, create realistic potential for automation, remove coil winding cost and throughput bottleneck, and increase attainable performance in longer coils.

In the illustrated example of FIG. 2, fiber 200 includes four individual cores 220. As seen, each of the individual cores 220 can be arranged in a configuration that geometrically resembles a square. For example, each of the four cores 220 can be considered as one of the four corners of the square. Each side of this square, formed by the four individual cores 220, can have sides that are 50 µm (corners of square and center accurate to +/−5 µm) in length. The center can be concentric with the cladding to +/−1 µm.

Referring now to FIG. 3, an example of a multicore shuffle bridge 300 is depicted. The multicore shuffle bridge 300 can be a component of the multicore gyro coil winding, as disclosed herein. As a general description, the bridge 300 serves as a multicore fiber connector. The bridge 300 can be a short section of a custom multicore waveguide that: incorporates break-in/break-out functions; connects to bare fiber coil ends by splice; interfaces to gyro photonic integrated circuit (PIC) in a conventional manner; and facilitates light rotation from core to core.

In one implementation, the multicore shuffle bridge 300 can be configured to allow small fibers to be routed into multi-hole glass ferrules 310. The glass ferrules 310 can have a glass diameter that is comparable to the multicore fiber cladding diameter. The interstices between small fibers may be glass filled using additive manufacturing, resulting in an all-glass structure with integral break-in/break-out small fibers and end faces having the same dimensions and configuration as the multicore fiber. The glass ferrules 310, at the two bridge ends, can be made from similar material to the multicore fiber cladding, with the intention of enabling a fusion splice to multicore fiber at each of the two bridge ends. In one aspect, the shuffle bridge may include small fibers routed into a ferrule that defines a plurality of apertures or holes. In another aspect, the fiber cladding can comprise a metallic, glass, epoxy, fiberglass, plastic, or composite. The break-in/break-out fibers are exposed in the bridge center 320 and may be integrated to PIC coil ports as is done in a convention gyro assembly process. In the case of a four-core fiber, as shown in FIG. 2, the mating fiber ends can be rotated relative to one another, for example by 90°. The feature can have several effects, including: the core-to-core shuffle is produced; shuffled mating cores are facing each other in the same orientation across the bridge 300. In this arrangement, referring to the rotated and mated fiber ends, the direct facing shuffled cores are connected by small fibers spanning the bridge in a straight line, with no requirement for use of polarization maintaining fiber and no depolarization across the short bridge.

In general, truly assessing the benefits of a multicore fiber gyro requires having an understanding of the Shupe effect. In a method, the following heuristic argument supports the development of coil winding patterns that: have a degree of symmetry that, combined with the thermal Shupe mitigation inherent in multicore fiber, offers a path to high precision in a fiber gyro; have sufficient resemblance to a level wind to allow a path to automation.

In FIG. 4, an example of a four-core fiber gyro coil is illustrated (although other core counts can be considered). During operation, an optical signal can propagate successively through core 430 (core 1) through core 450 (core 4), and in the reverse direction in accordance with fiber gyro optical design. Splices at the shuffle bridge 420 connect the core ends and connect core 420 (core 1) and core 450 (core 4) to the break-in/break-out fibers 470 that further connect to the PIC 420. Thus, the configuration in FIG. 4 forms a multicore fiber equivalent optical loop that connects all of the cores 430, 440, 450, and 460.

Referring now to FIG. 5, an example of a multicore fiber gyro coil winding pattern 500 is shown. In particular, the winding pattern 500 in the illustrated example is a level winding pattern. For purposes of illustration, the turns per layer, and the number of layers in the pattern are reduced for simplicity. In accordance with the level winding pattern 500, fiber turns can be wound around a mandrel from flange to flange. During the winding of fiber around the spool, then windings of the fiber can advance to a higher layer where turns can rest in a groove formed by the underlying turns.

FIG. 6 shows another example of a multicore fiber gyro coil winding pattern 600 is shown. The illustrated example of FIG. 6 particularly shows the Interrupted Level Wind (ILW) pattern. Winding can begin at a bottom layer, and the fiber can be drawn alternately from two feed reels (dashed line delineates fibers from alternate reels). Also shown in FIG. 6 are crossed arrows, which indicate a location where the feed reels are exchanged between left and right side of the winding machine. As illustrated in FIG. 6, a "center of coil pattern" 610 can be a midpoint between shuffle bridge passage for each of the fiber cores. The winding ends up at the top center, where the shuffle bridge 620 connects the fiber ends break-in/break-out (i.e., break-in fiber leads, break-out fiber leads) to the PIC 630. The ILW pattern 600 can be described as having four zones, including: Zone 1) outer half adjacent to the mounting surface; Zone 2) outer half further from the mounting surface; Zone 3) inner half adjacent to the mounting surface; and Zone 4) inner half further from the mounting surface. Additionally, FIG. 6 illustrates numbers of fiber turns on the top layer indicating a turn count, beginning at the shuffle bridge 620. The coil is wound in a mandrel that can be disassembled after epoxy cure, which can leave the coil free standing. The coil is mounted at one side to a mounting surface 640. This arrangement tends to direct transient heat flow gradients axially across the winding. In some cases, it can be assumed that the heat flow is purely axial.

As alluded to above, Shupe effect can impact assessment of the multicore fiber gyro coil winding pattern. In this example, the Shupe effect can produce phase errors in a gyro coil when time dependent thermal gradients cause optical fiber elements at equal distances from the optical loop center (the point where core two is spliced to core 3) to expand by different amounts. This effect can be proportional to the product of: 1) physical separation between the two fiber elements; and 2) time that elapses in the optical wave passing from loop center to the symmetric fiber elements. A physical distance separating the fiber element pairs is the same for all layers. In a simplification that allows for calculation, an average of physical pair separation distances over zone 1 and zone 2 can be equal to that for zone 3 and zone 4. This simplification allows the Shupe factor associated with separation distances to be approximated as a constant and the phase error to be represented on a zone average basis. The factor associated with elapsed time can increase monotonically as the optical signal passes from zone to zone.

A zero point in the pattern 600, can be at the splice between core 2 and core 3. FIG. 6 shows that abovementioned zero point can be midway around the fiber loop, relative to the core 1 and core 4 splice, where the fiber loop connects to the PIC 630. Thus, all constant terms in the Shupe phase error equation can be normalized to one, including the relationship between elapsed time and length along one layer of fiber within a zone. This leaves only the layer count to the midpoint of a zone, as the phase error magnitude associated with that particular zone. Examples of contributions of zones to the Shupe effect, and the summation of these contribution with respect to the ILW pattern in FIG. 6 are included in table 1 below.

TABLE 1

| | Core 2 anti Core 3 | | Core 1 and Core 4 | | |
|---|---|---|---|---|---|
| +/− | Splice > Center | Center > Splice | Splice > Center | Center > Splice | Total |
| + | 2 | 10 | 18 | 26 | 56 |
| − | 6 | 14 | 22 | 30 | 72 |

As an example, either one of zone 2 or zone 3, can be to the right of one of zone 1 or zone 4, creating a positive phase error and the condition with zone 1 or zone 4 to the right as negative. Layer count from the fiber loop center at the core 2/core 3 splice to the center of upper right zone is 2. Each subsequent zone change adds four to the layer count. The phase error contributions can alternate positive (positive row in Table 1) and negative (negative row in Table 1). The total positive and negative phase error are different in the example, yielding a net negative phase error of 16. This phase effect is approximately equal to the average error associated with a single zone, indicating that the Shupe effect reduced by a factor of eight (e.g., showing a slight improvement).

Now, referring to FIG. 7, another example of a multicore fiber gyro coil winding pattern 700 is shown. This example illustrates a Dual Axis Symmetric (DAS) winding pattern. As the name suggests, this pattern 700 involves a degree of symmetry in both axial and radial directions. This pattern 70 has more zones as compared to the ILW pattern (shown in FIG. 6), as the DAS pattern 70 uses six zones as opposed to four zones (used by ILW). Further, FIG. 7 illustrates that the top and bottom zones are smaller (e.g., half the size) than the other zones. A Shupe calculation, with respect to the DAS pattern 700, multiplies the average layer count of a half-sized zone by ½, to allow for a side-by-side comparison with the ILW pattern. Examples of contributions of zones in the DAS pattern 700 to the Shupe effect phase error, and the summation of these errors, is shown in Table 2 below.

TABLE 2

| | Core 2 and Core 3 | | | Core 1 and Core 4 | | | |
|---|---|---|---|---|---|---|---|
| +/− | Splice > Center | Center | Center > Splice | Splice > Center | Center | Center > Splice | Total |
| + | .5 | 3.5 | 12 | 18 | 11.5 | 28 | 64 |
| − | 4 | 4.6 | 7.5 | 22 | 12.5 | 15.5 | 64 |

Layer count from the fiber loop center at the core/core3 splice to the center of the upper right zone is 1. From the center of the top zone to the center of the bottom zone is a layer increment of three, for a cumulative layer count of 4. For example, subsequent layer increments can be 3, 2, 3, 3, 2, 3, 3, 2, 3 and 3 respectively. The phase error contributions alternate positive (positive row in Table 2) and negative (negative row in Table 2). Tabulated total positive and negative phase errors are equal, for a net phase error of zero. This phase error calculation reflected in Table 2 indicates that the Shupe effect is significantly reduced in the ADS pattern 700, as compared to the ILW pattern, for example.

In addition, to pattern related Shupe reduction, the multicore fiber coil has fewer layers and fewer turns per layer, reducing physical distance between fiber element pairs. The smaller pack cross section facilitates equalizing coil pack temperature with a thermally conductive enclosure. These considerations, collectively, can lead to confidence that a multicore fiber gyro coil will have superior performance to a quadruple wound single core fiber.

In comparing the ILW winding pattern (shown in FIG. 6) and the DAS winding pattern (shown in FIG. 7), commonalities can include, but are not limited to: 1) reducing the instances where a feed reel transition generates a flange interference with layer bridging fibers; 2) layer transitions are identical to those experienced with level winding; 3) feed reel exchanges occur in the center of wound layers, instead of at the flanges. The aforementioned features can realize advantages associated with the ILW and DAS winding patterns.

There are some instances where the ILW and DAS patterns may require frequent reel exchange. These scenarios can occur when: level winding in a given zone relies on adjacent turns associated with a different feed reel for support, this typically occurs every two layers; the patterns make an exchange of the sides on which feed reels are located. In detail, this exchange occurs once in the ILW pattern example (shown in FIG. 6, indicated by crossed arrows) and twice in the DAS example (shown in FIG. 7, indicated by crossed arrows). Often times, gyro winding can present challenges to those with limited experience, such as apprentice technicians.

Another challenge regarding gyro coil winding involves the difficulties caused by layer transition interference. Even further, there are few technicians that learn adequate techniques to mitigate this winding precision disruptor. Consequently, eliminating such issues can lead to several advantages relating to personnel, for example greatly widening the pool of technicians that can move up to regular coil production. Transition interference is also thought to be a significant factor that is impeding advancements in coil winding automation. However, with DAS pattern, automation can accomplish the layer transition and feed reel exchange operations. Thus, automation can be achieved with the disclosed winding patterns, keeping in mind that detailed characterization of machine motions and design of mechanism are required to realize implementation. Therefore, transition to ILW or DAS patterns can open a path to coil winding automation. A critical component to this transition to automation is the successful development of multicore fiber coils. This can both expand the pool of winding technicians and allow fully automated winding processes to be developed. These improvements can ultimately lead to relieving the production rate bottleneck that is currently being experienced in the realm of fiber optic gyro coils. Full automation can provide additional benefits, such as driving down winding costs to a level that can positively impact the INS market structure.

A baseline comparison of single core optical fiber quadruple wound gyro coil to the disclosed multicore fiber gyro coil winding patterns is shown in Table 3 below.

TABLE 3

| Coil ID | Manual Winding (time, hours) | Manual Skill Level (1-10) | Is Automation Possible? | ROM Drift Performance Estimate | Throughput (with automation, if possible) | Winding Cost per Automated Coil ($) | Performance Divided by Cost |
| --- | --- | --- | --- | --- | --- | --- | --- |
| Single Core quadruple | 4 | 10 | No | 5 | 10/week | 1,000 | 0.005 |
| Multicore quadruple | 1 | 8 | No | 10 | 40/week | 250 | 0.04 |
| Multicore Level Wind | 0.3 | 2 | Yes | 2 | 360/week | 25 | 0.08 |
| Multicore ILW | 0.5 | 4 | Yes | 4 | 240/week | 35 | 0.11 |
| Multicore DAS | 0.8 | 6 | Yes | 10 | 150/week | 65 | 0.15 |

In Table 3, for example, the time column represents the time it takes to wind a 1 km, 40-layer single core quadruple compared to a 1 km optical path four core fiber. Additionally, it should be appreciated that values in Table 3 represents engineering estimates. Nonetheless. Table 3 serves to illustrate the numerous advantages in coil winding performance that are provided by multicore fiber, such as cost and throughput.

As an example, implementation stages of a multicore gyro technology development effort can include:

Through modeling, simulation, and analysis; design a multicore optical fiber gyro that opens a path to high performance, high throughput, low-cost optical fiber gyros.

Develop methods of producing the splice bridge for a multicore optical fiber gyro coil.

Wind proof of concept coils and measure critical performance metrics including gyro drift in a thermal shock environment, attenuation, depolarization, mechanical shock, and vibration tolerance.

Identify applications where the capabilities enabled by multicore optical fiber gyros will have the greatest and most immediate impact.

Identify a PIC foundry and a manufacturing organization for integration of multicore fiber optic gyro coils into a production FOG.

Fabricate, test, and demonstrate a pilot run.

Provide a plan for transition to full deployment in one or more targeted applications.

FIG. 8 is a flow chart setting forth the general stages involved in a method 800 consistent with an embodiment of the disclosure for providing multicore fiber optic gyro. In at least one aspect, method 800 may be implemented using a computing device for automated winding.

Although method 800 can be performed by computing device, it should be understood that, in some embodiments, different operations may be performed by different networked elements in operative communication with a computing device. For example, a server and/or computing device may be employed in the performance of some or all of the stages in method 800. Moreover. Similarly, an apparatus may be employed in the performance of some or all of the stages in method 800. Although method 800 has been described to be performed by a computing device or platform, it should be understood that the various stages of method 800 may be performed manually.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 800 will be described in greater detail below.

Method 800 may begin at starting block and proceed to stage 802 where two feed reels may be oriented at a bottom layer of a spool. From stage 802, method 800 may advance to stage 804 where the winding process begins by winding a first fiber of the first feed reel and a second fiber of the second feed reel around a mandrel of the spool, the first fiber is wound around the spool prior to the second fiber. Once the winding process has begun in stage 804, method 800 may continue to stage 806 where the processing continues by exchanging an order of a feed reel sequence by winding the second fiber prior to the first fiber around the mandrel of the spool. Once the process continues in stage 806, method 800 may then end, continue, or repeat as necessary.

As used herein, the term "or" may be construed in either an inclusive or exclusive sense. Moreover, the description of resources, operations, or structures in the singular shall not be read to exclude the plural. Conditional language, such as, among others, "can," "could," "might," or "may" unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

Aspects

The following disclose various Aspects of the present disclosure. The various Aspects are not to be construed as patent claims unless the language of the Aspect appears as a patent claim. The Aspects describe various non-limiting embodiments of the present disclosure.

Aspect 1. An optical fiber gyro, comprising: an optical fiber having more than one waveguide core.

Aspect 2. The optical fiber gyro of Aspect 1, wherein the optical fiber is wound into a coil.

Aspect 3. A shuffle bridge, comprising small fibers routed into multi-hole glass ferrules, wherein the glass ferrules have a glass diameter substantially similar to a multicore fiber cladding diameter and similar material to that of a multicore optical fiber cladding.

Aspect 4. The shuffle bridge of Aspect 3, wherein the glass ferrules are configured for shuffled mating.

Aspect 5. The shuffle bridge of Aspect 3, wherein shuffled mated cores are facing each other in the same orientation across the bridge, whereby depolarization across the shuffle bridge can be avoided.

Aspect 6. The shuffle bridge of Aspect 3, wherein interstices are glass filled.

Aspect 7. The shuffle bridge of Aspect 3, wherein the shuffle bridge is fabricated using additive manufacturing.

Aspect 8. An optical fiber gyro, comprising a coil, wherein the coil is a free-standing multi-core fiber coil.

Aspect 9. A multicore optical fiber gyro comprising a coil wound on a mandrel; and further comprising at least one of: fixed flanges or removable flanges.

Aspect 10. An optical fiber gyro coil comprising: an optical fiber thereon having more than one waveguide core; a design configured for automation of the winding process, thereby achieving low Shupe effect in a gyro without a requirement for layer transitions at one or more flanges.

Aspect 11. A method for generating an optical fiber gyro coil comprising: orienting two feed reels at a bottom layer of a spool, wherein a first feed reel comprises a first fiber and a second feed reel comprises a second fiber. Winding the first fiber of the first feed reel and the second fiber of the second feed reel around a mandrel of the spool, wherein the first fiber is wound around the spool prior to the second fiber. Exchanging an order of a feed reel sequence by winding the second fiber prior to the first fiber around the mandrel of the spool. In a further aspect, the feed reel exchange can be configured to occur in the center of a wound layer.

Aspect 12. The method of generating an optical fiber gyro coil, further comprising alternating the order of the feed reel sequence to generate an Interrupted Level Wind pattern for a cross section of the optical fiber gyro coil.

Aspect 13. The method of generating an optical fiber gyro coil, further comprising alternating the order of the feed reel sequence to generate a Dual Axis Symmetric pattern for a cross section of the optical fiber gyro coil.

Aspect 14. Optical fiber gyro coil using optical fiber having more than one core and having a shuffle bridge to: 1) exchange cores and 2) provide break in/breakout fiber leads.

Aspect 15. An Inertial Navigation Unit (INU) comprising one or more fiber optic coils comprised of multi-core fiber coils.

Aspect 16. An Inertial Navigation Unit (INU) comprising one or more fiber coils each comprising a plurality of optical waveguide cores.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An optical fiber gyro coil, comprising:
   an optical fiber thereon comprising a plurality of waveguide cores;
   a shuffle bridge configured to:
      exchange at least one waveguide core of the plurality of waveguide cores,
      and to provide at least one of a break-in fiber lead and a breakout fiber lead.

2. The optical fiber gyro coil of claim 1, wherein the optical fiber gyro coil further comprises ends oriented to face each other, wherein the shuffle bridge is fusion spliced to connect the ends of the optical fiber gyro coil.

3. The optical fiber gyro coil of claim 2, wherein each of the break-in fiber lead and the breakout fiber lead emerge from the shuffle bridge and are optically integrated with a gyro electro-optic interface.

4. The optical fiber gyro coil of claim 3, wherein the gyro electro-optic interface comprises a photonic integrated circuit (PIC).

5. The optical fiber gyro coil of claim 1, wherein the shuffle bridge further comprises small fibers routed into a ferrule that defines a plurality of apertures.

6. The optical fiber gyro coil of claim 5, wherein the ferrule is comprised of glass.

7. The optical fiber gyro coil of claim 5, wherein the ferrule comprises a diameter dimension that is substantially similar to a diameter dimension of a cladding of a multicore fiber.

8. The optical fiber gyro coil of claim 5, wherein the ferrule comprises a material that is the same as a material of a multicore optical fiber cladding.

9. The optical fiber gyro coil of claim 1, further comprising a winding pattern.

10. The optical fiber gyro coil of claim 9, wherein the winding pattern comprises a quadrupole winding pattern.

11. The optical fiber gyro coil of claim 9, wherein the winding pattern comprises a level winding pattern.

12. The optical fiber gyro coil of claim 9, wherein the winding pattern comprises an interrupted level winding pattern.

13. The optical fiber gyro coil of claim 9, wherein the winding pattern comprises a dual axis symmetric winding pattern.

14. The optical fiber gyro coil of claim 1, further comprising a feed reel exchange configured to occur in a center of a wound layer.

15. The optical fiber gyro coil of claim 1, further comprising feed reel transitions configured to reduce flange interference with layer bridging fibers, wherein a layer transition comprises a level winding pattern.

16. The optical fiber gyro coil of claim 1, wherein the optical fiber gyro coil is configured to facilitate a lower Shupe effect in a gyro without a requirement for layer transitions at one or more flanges.

17. The optical fiber gyro coil of claim 1, wherein the optical fiber gyro coil is a free-standing multi-core fiber coil.

18. An multi-core fiber apparatus comprising:
   an optical fiber gyro coil wound on a mandrel, the mandrel comprising at least one of: fixed flanges and removable flanges;

the optical fiber gyro coil further comprising:
an optical fiber thereon comprising a plurality of waveguide cores; and
a shuffle bridge configured to:
exchange at least one waveguide core of the plurality of 5 waveguide cores,
and to provide at least one of a break-in fiber lead and a breakout fiber lead.

* * * * *